United States Patent [19]

Zhang

[11] Patent Number: 4,836,022

[45] Date of Patent: Jun. 6, 1989

[54] BI-COLOR FLUVIOGRAPH OF TRANSMISSION AND REFLECTION TYPE

[76] Inventor: Long N. Zhang, Man Rong Cun, Hun He Zhan Xiang, Dong Ling Qu, Shen Yang City, Liao Ning Province, China

[21] Appl. No.: 71,499

[22] Filed: Jul. 9, 1987

[51] Int. Cl.$^4$ .............................................. G01F 23/02
[52] U.S. Cl. ......................................... 73/293; 73/328
[58] Field of Search ................... 73/293, 328; 250/577

[56] References Cited

U.S. PATENT DOCUMENTS

| | | | |
|---|---|---|---|
| 706,959 | 8/1902 | Knox | 73/293 |
| 1,148,523 | 8/1915 | Monro et al. | 73/293 |
| 1,293,993 | 2/1919 | Vastine | 73/293 |
| 1,788,198 | 1/1931 | Kauffmann, Jr. | 73/293 |
| 2,024,815 | 12/1935 | Blackburn | 73/293 |
| 2,351,100 | 6/1944 | Brelsford | 73/293 |
| 2,356,267 | 8/1944 | Pelunis | 73/293 |
| 2,369,798 | 2/1945 | Rasmussen | 73/293 |
| 2,949,031 | 8/1960 | Bruni et al. | 73/293 |
| 3,053,089 | 9/1962 | Neyer | 73/293 |
| 3,648,521 | 3/1972 | Amendolia | 73/293 |

FOREIGN PATENT DOCUMENTS

| | | | |
|---|---|---|---|
| 44/11756 | 5/1969 | Japan . | |
| 398945 | 9/1933 | United Kingdom | 73/293 |

Primary Examiner—William A. Cuchlinski, Jr.
Assistant Examiner—Thomas B. Will
Attorney, Agent, or Firm—Armstrong, Nikaido, Marmelstein & Kubovcik

[57] ABSTRACT

This invention relates to a bi-color fluviograph of transmission and reflection type, which increases the intensity of the red and green lights. Colored light sources are used and the principles of transmission and reflection of prism are adopted to transmit or reflect red and green light respectively. When there is some water in it, red color can be seen clearly. When there is no water, green color can be seen clearly. This new fluviograph improves the utilizing condition of the former bi-color fluviograph of transmission and reflection type. It can reduce the frequency of cleaning the steam boiler fluviograph which has no water treatment equipment and it can also used for pressure containers with poisonous and combustible.

7 Claims, 4 Drawing Sheets

BI-COLOR FLUVIOGRAPH OF TRANSMISSION AND REFLECTION TYPE

This invention relates to the supervision of the water level used in low-pressure steam boilers and pressure containers. Particularly, it is a bi-colour fluviograph of transmission and reflection type.

The inventor of the present invention filed a application with the Chinese Patent Office on Aug. 13, 1985, which was an improvement based on a Japanese patent (Ser. No.: Sho 44-11756 of Japan). That improvement means enables the observer, at a longer distance and in a larger angular scope, to distinguish red or green colours shown by the fluviograph and correctly determine the water level and detect whether the water container is empty or full. However, that kind of fluviograph requires the boiler to use high quality water. Usually, a steam boiler uses untreated hard water which contains a lot of impure substances. The impure substances always make the glass surface of the fluviograph dirty. Main compositions of the impure substances will appear in the form of iron rust ($F_2O_3$, $Fe_3O_4$). It is known that iron rust is red and purplish red. The principle of showing the existance of water or air in the above Chinese Patent is when there is water in a fluviograph, owing to the transmission of the prism, the green board is lighted and only green colour is seen from the viewing window. But if there is too much iron rust in the water and stains the glass surface of the fluviograph and the green board, red is shown from the glass surface. The green board is mingled with red colour. And then instead of seeing only green colour from the viewing window, the green light is transmitted through the red glass board. This green light is therefore very weak and it is possible that it may bring mcuh obstructions to the observer. Observation will become impossible when staining is serious. The usual way to solve the problem is to clean it every day and strip and wash it regularly. Obviously, this solution is inconvient and affects the utilization ratio of the boiler.

In order that the double-colour fluviograph can work regularly under all kinds of water qualities, the inventor improves his old fluviograph. The original positions of red and green colours are exchanged and a coloured light source is used instead of a ordinary light source. When water is in the fluviograph, the light directed towards prism from light source is a red light. Owing to the transmission of the prism, the red transmitted light lights up the red board, thus strongly increasing the light intensity of the red light. Even under conditions of poor water quality or serious turbid water, the red light is shown clearly because of adequate light intensity. When a container is full of air, owing to the reflection of the prism, the green part lighted up by the reflected light is seen from the viewing window. When a fluviograph has both water and air, it shows both red and green colours. The boundary between the red and green colours indicates the water level.

A preferred embodiment 1 of the present invention is illustrated in the accompanying drawings, in which.

DESCRIPTION OF THE PREFERRED EMBODIMENT

Figure 1:
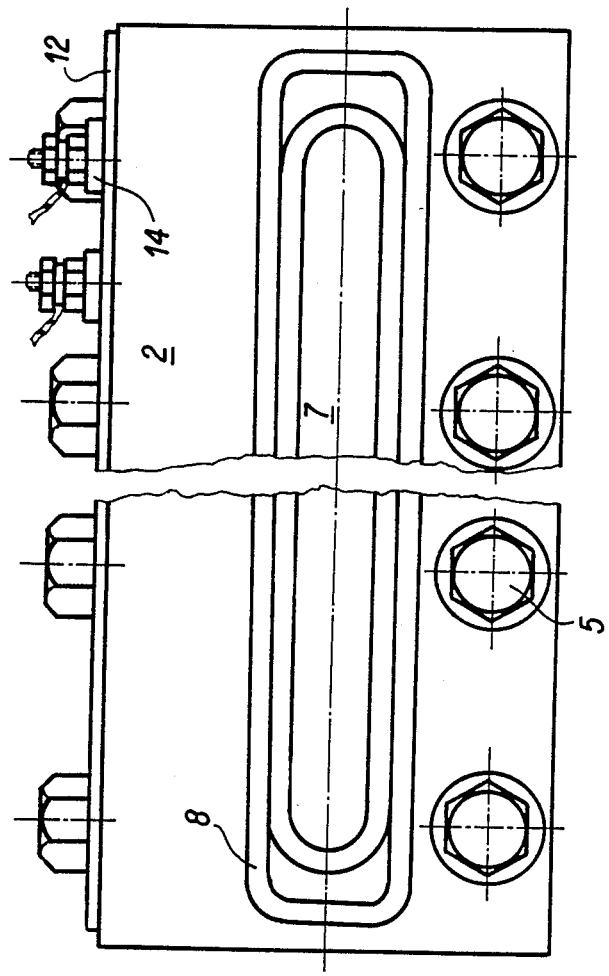
FIG. 1 is a front elevation of the fluviograph.
Figure 2:
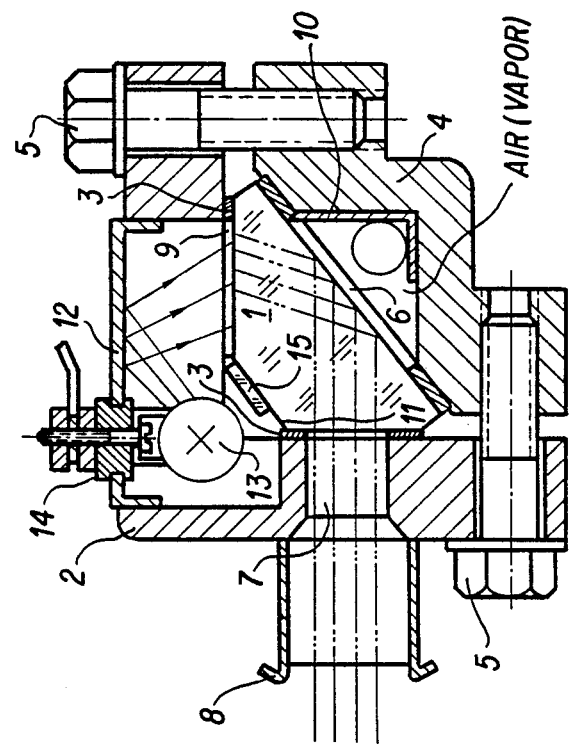
FIG. 2 is a schematic diagram of reflection when the fluviograph is full of air.
Figure 3:
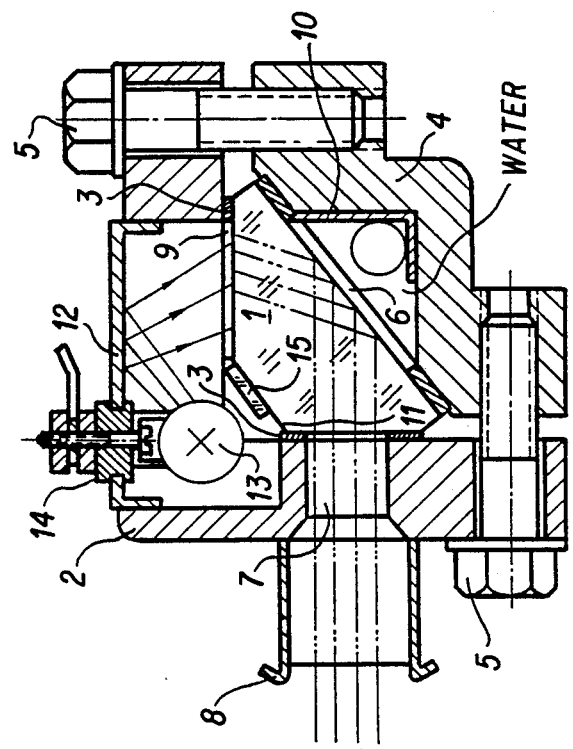
FIG. 3 is a schematic diagram of the reflection when the fluviograph is full of water.
Figure 4:
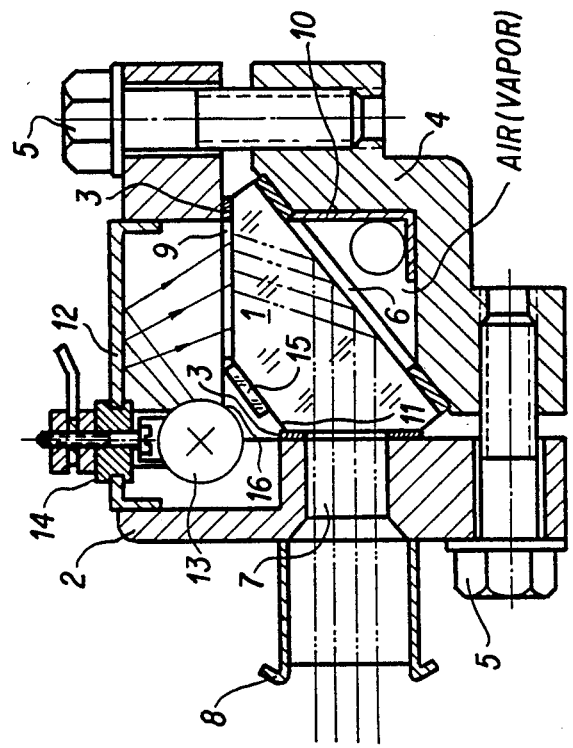
FIG. 4 is a schematic diagram of another fluviograph.

Prism (1) of 90°, 38°, 52° degrees are fixed on the inner side of the right angled bottom board (2). There are spacers (3) between the surfaces of two right angled sides and bottom board (2) of the prism. The container (4) and the bottom board (2) are fixed with screws (5). The inner side plane of the container and the slope (6) of the prism are pressed together tightly with airtight seal in between. In addition, the bottom board has a viewing window (7) with a lens hood (8) to prevent interference by foreign light. One side plane of the prism is painted green (9). A red board (10) is fixed on the inner side plane of the container above the slope (6). A 6 watt fluorescent lamp (13) is fixed on the side cover board (12) at the lower portion of the small plane (11) of the prism. The fluorescent lamp is held in position by insulating lamp-holders (14) on the side cover board (12). Between the small plane (11) of the prism and the fluorescent lamp (13), a red glass board (15) is placed. When power is switched on, the fluorescent lamp gives out a light as shown in the drawing. A part of the light passing through the red glass board (15) becomes red light and is transmitted through the prism and lights up the red glass board (10) of the inner side of the container. The other part of the light as shown in the drawings is relected by the inner side plane of the side cover board and lights up the green board (9). When the container is full of air, looking from the viewing window, the green board (9) lighted up by the reflected light is seen because of the reflection of the prism. When the fluviograph is full of water, light passes through the red glass board (15) and becomes a beam of red light which goes through the prism to light up the red part (10). Only red colour is seen from the viewing window. When the fluviograph has both water and air, red and green colours are shown. The boundary between the red and green colours is the water level.

EMBODIMENT 2. AS SHOWN IN FIG. 4.

Difference between embodiment 2 and embodiment 1 is that the light source is painted red directly. The part of the light source facing the small plane (11) is painted red (16). When power is switched on, the light shooting at the prism is red light whereas the light shooting at the inner side plane of the side cover board is ordinary light. If the light source facing the side cover board (12) is painted green, then the light shooting at the inner side plane of the side cover board is green. Transmissed light lights up the red part and the reflected light may be white or green. Thereby the light intensity of the red and green lights are increased greatly. When the fluviograph is full of water, red can be seen clearly. When full of air, green can be seen clearly.

Although two preferred embodiments of the invention have been shown and discribed, the invention is not limited to the preferred embodiment since substitution of elements, components and assembles, as well as modification within the scope of the invention will be apparent to those skilled in the art upon reading the foregoing description. The invention is therefore to be construed to include all such substitutions and modifications which are within the scope of the appended claims.

The present fluviograph widens the using conditions of the bicolour fluviograph and reduces the frequency of washing the fluviograph of steam boiler which is without water treatment condition. It can be also used permanently on a steam boiler of a steam power train without washing equipment. It may also used for pressure containers with poisonous or combustible liquid.

What is claimed is:

1. A bi-color fluviograph of a transmission and reflection type comprising:
   a housing;
   a viewing window disposed on one side of the housing;
   a prism disposed in said housing, said prism having the cross-sectional shape on a non-equilateral right triangle having first and second sides and a base with said first side facing said viewing window, wherein the apex of said right triangle prism is beveled to form a small plane parallel to the base of the prism; and
   a light source disposed in said housing for projecting light onto said second side and said small plane of said prism, and
   wherein an interior wall of said housing, on an opposite side of said prism from said viewing window, is red, and said second side of the prism is green, wherein fluid to be measured flows into said housing between said base and said red colored wall.

2. The bi-color fluviograph of claim 1, wherein said housing comprises at least a bottom board having said viewing window and a container for supporting said prism therebetween.

3. The bi-color fluviograph of claim 1, wherein said light projected into the prism is colored light.

4. The bi-color fluviograph of claim 1, further comprising a red glass board positioned on said small plane such that red light is projected into said prism.

5. The bi-color fluviograph of claim 1, wherein a portion of the light source projecting light into said small plane is red, such that red light is projected into said prism.

6. The bi-color fluviograph of claim 2, wherein said housing also comprises a side cover board which covers said second side of said prism, and reflects light received from a first portion of said light source onto said second side.

7. The bi-color fluviogaph of claim 6, wherein said first portion of the light source, projecting light onto said side cover board, projects green light onto said side cover board and a second portion of the light source projecting light onto said small plane is red.

* * * * *